Dec. 10, 1935.    W. H. GRIMBALL    2,023,523
SPECTACLES
Filed May 23, 1935
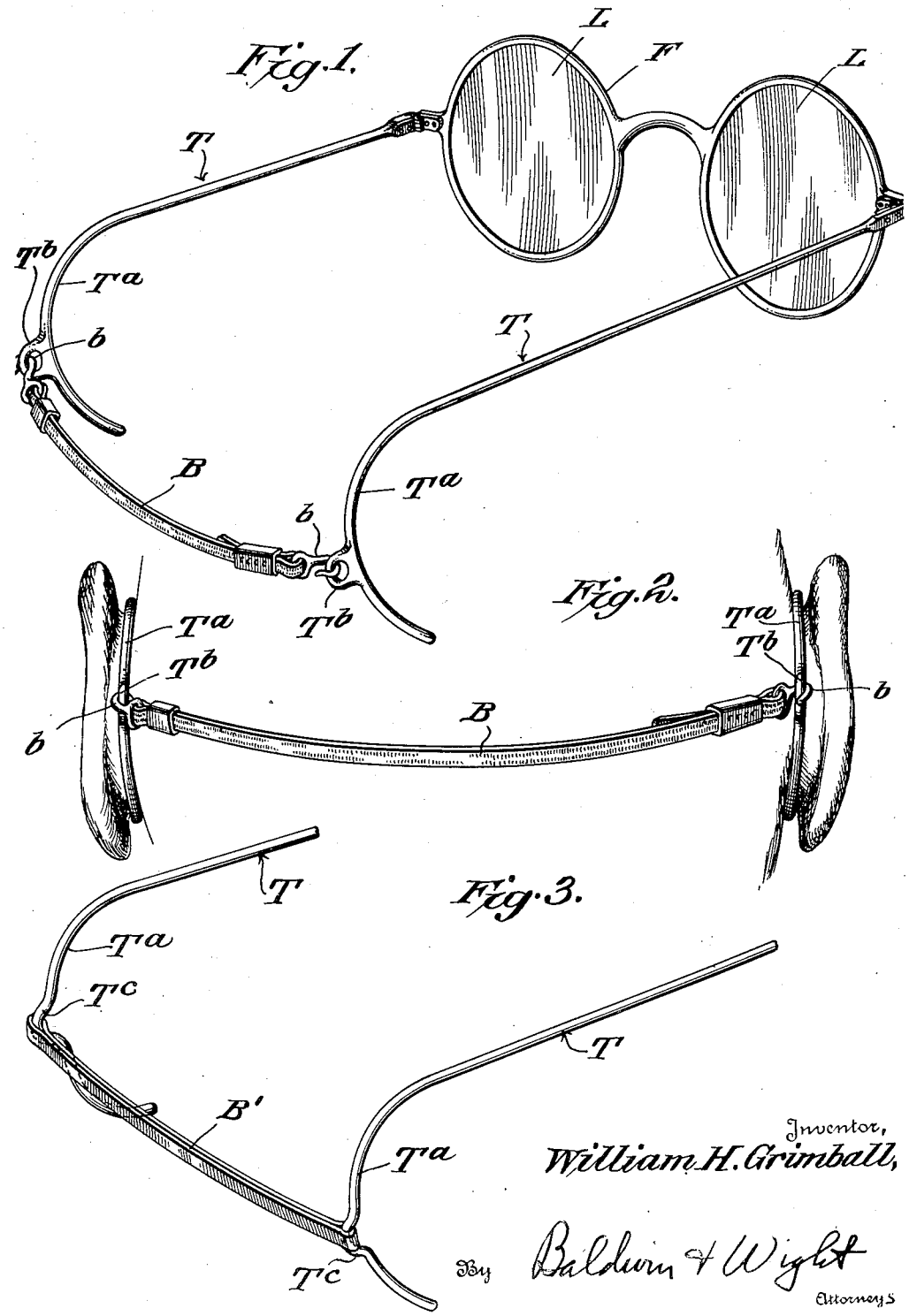

Patented Dec. 10, 1935

2,023,523

UNITED STATES PATENT OFFICE 2,023,523

SPECTACLES

William H. Grimball, Charleston, S. C.

Application May 23, 1935, Serial No. 23,093

4 Claims. (Cl. 88—51)

This invention relates to spectacles and more particularly to temple pieces therefor.

Many people, especially sportsmen and players of athletic games, frequently are troubled with the tendency of their spectacles to fall off and to be broken or lost, resulting in constant worry and annoyance. In accordance with my invention I form the temple pieces of spectacles in a novel manner to provide for the attaching of an elastic band or the like adapted to pass around the back of the wearer's head so as to prevent the spectacles from falling off.

An object of the invention is to provide a novel and improved construction and arrangement of spectacle parts, so organized as to be adapted to be firmly attached to the wearer yet being substantially as comfortable as conventional spectacles. Another object is to provide a temple piece construction by means of which an elastic arranged as specified above will be maintained in place without its being under tension sufficient to cause the wearer any discomfort. Other objects will become apparent from a reading of the following description, the appended claims, and the accompanying drawing, in which:

Figure 1 is a perspective view of one form of spectacles embodying my invention;

Figure 2 is a diagrammatic view; and

Figure 3 is a fragmentary perspective view of a modified form.

The embodiment of the invention shown in Figures 1 and 2 comprises a spectacle frame F fitted with lenses L in a conventional manner, a pair of temple pieces generally designated T—T and an adjustable elastic band B connected to the temple pieces and adapted to pass around back of the wearer's head.

I have found that merely attaching an elastic to the rear ends of temple pieces of the ordinary and usual construction does not achieve the desired results because of the tendency for the elastic to slip off. In accordance with my invention the unjointed curved ear-embracing portions $T^a$—$T^a$ of the temple pieces T—T are curved substantially on the plane of the side of a wearer's head, the curvature being such as to adapt the portion $T^a$ to pass behind the wearer's ear from top to bottom and are formed or provided intermediate their ends with humps or eyelets adapted to prevent the elastic from slipping off. The eyelets may be either closed, as shown at $T^b$—$T^b$ in Figures 1 and 2, or open, as shown at $T^c$—$T^c$ in Figure 3, this type of eyelet being provided by forming the ear-embracing portion with a loop having its open side facing forward. The elastic band B, being engaged with the eyelets, is not susceptible to accidental displacement, and consequently the spectacles are not apt to fall off. In the form shown in Figures 1 and 2 the elastic band may be provided with hooks $b$ for connection to the closed eyelets $T^b$. The embodiment shown in Figure 3 is somewhat more simple, an ordinary looped elastic band B' engaging the open eyelets $T^c$.

An important feature of the invention resides in the locating of the humps or eyelets intermediate the ends or extremities of the curved ear-engaging portions $T^a$—$T^a$. By virtue of this particular arrangement the pressure due to the tension in the elastic band is applied to the wearer's head throughout the entire curved portions, and this not only contributes to the comfort of the wearer but also prevents outward bowing or springing of the straight portions of the temple pieces. Moreover, only a very slight and gentle pressure of the curved ear-embracing portions is sufficient to hold the spectacles firmly in place.

The spectacles shown and described embody the invention in practical and the now preferred forms, but it will be understood that changes may be made without departing from the invention as defined in the claims.

I claim:

1. In spectacles, the combination of temple pieces having curved ear-embracing portions at least one of which curved portions is intermediately formed with an eyelet, and an elastic member connected to said eyelet and adapted to pass back of a wearer's head for connection to said other temple piece ear-embracing portion.

2. In spectacles, the combination of temple pieces having curved ear-embracing portions each formed with an eyelet intermediate its ends, and an elastic member connected to said eyelets and adapted to extend back of a wearer's head.

3. A temple piece for spectacles comprising a continuous relatively straight portion and unjointed ear-embracing portion having a curvature substantially in the plane of the side of a wearer's head and adapting said portion to pass behind a wearer's ear from top to bottom, the latter portion being provided with an eyelet located intermediate its ends.

4. In spectacles, the combination as set forth in claim 1 and in which the eyelet is an open eyelet with the opening therein facing forward.

WILLIAM H. GRIMBALL.